United States Patent [19]

Nishino et al.

[11] Patent Number: 5,805,150
[45] Date of Patent: Sep. 8, 1998

[54] SYNCHRONOUS SIGNAL SEPARATION CIRCUIT

[75] Inventors: Hironari Nishino, Fujisawa; Hirokazu Nishimura, Sagaminara; Masayuki Sohda, Yamato, all of Japan

[73] Assignee: International Business Machines Corporation, Armonk, N.Y.

[21] Appl. No.: 532,125

[22] Filed: Sep. 22, 1995

[30] Foreign Application Priority Data

Sep. 22, 1994 [JP] Japan ..................... 6-227838

[51] Int. Cl.⁶ ........................................ G04G 5/00
[52] U.S. Cl. ............................. 345/213; 348/525
[58] Field of Search ................... 345/211, 212, 345/213, 204; 348/521, 525, 526, 527

[56] References Cited

U.S. PATENT DOCUMENTS 5,003,406 3/1991 Hatanaka et al. .

5,345,271 9/1994 Shin ........................................ 348/525

Primary Examiner—Regina Liang
Attorney, Agent, or Firm—Scully, Scott, Murphy & Presser

[57] ABSTRACT

A synchronous signal separation circuit is disclosed which separates and fetches a synchronous signal from a video signal to which the synchronous signal has been added. The synchronous signal separation circuit includes an amplifier for amplifying a voltage of the video signal to output an amplified signal having an amplified voltage which is within a predetermined dynamic range. A voltage generator outputs a variable offset voltage to the amplifier for shifting a reference level of the amplified voltage to a predetermined level. A synchronous signal fetch means which, by comparing the amplified video signal with a threshold voltage in which the variable offset voltage has been adjusted based on the degree of amplification of the amplifier, fetches only the synchronous signal from the video signal.

7 Claims, 4 Drawing Sheets

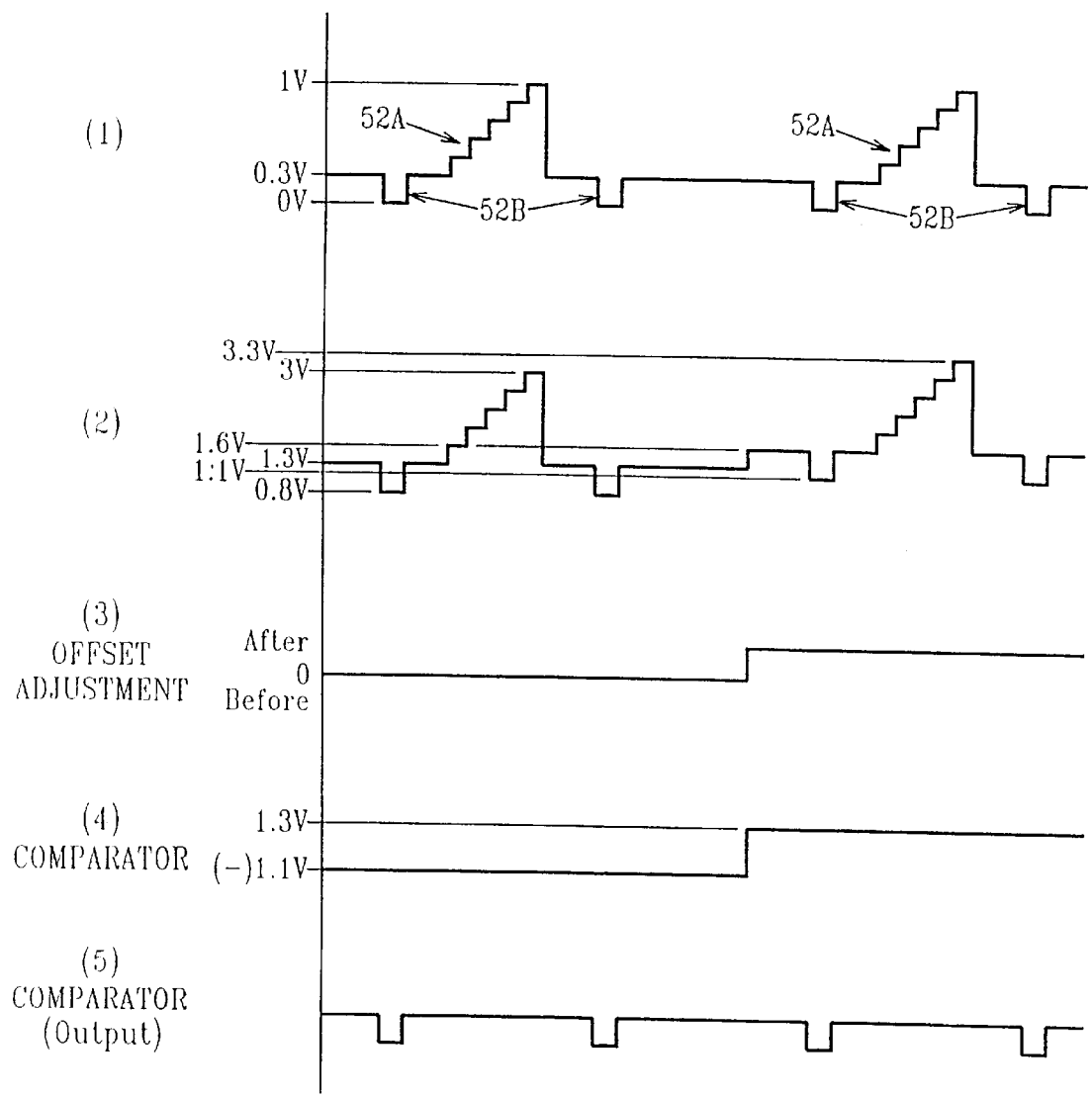

SYNCHRONOUS SIGNAL SEPARATION CIRCUIT

FIELD OF THE INVENTION

The present invention relates to a synchronous signal separation circuit for separating and fetching the synchronous signal from a video signal to which a synchronous signal has been added.

BACKGROUND ART

Generally, a video signal consists of each color signal of the three primary colors and a synchronous signal and is output after a synchronous signal has been added to a color signal of any of the three primary colors. The synchronous signal includes a horizontal synchronous signal and a vertical synchronous signal (composite signal), but it will hereinafter denote a horizontal signal, unless otherwise specially noted.

Generally, a green signal is selected as a color signal, and a synchronous signal is added to this green signal. This will hereinafter be referred to as a sync-on-green signal.

A video signal (video signal) that is output from a workstation or a personal computer is normally an analog signal. When a display that is applied as a monitor is a liquid crystal display monitor, however, the video signal of an analog signal must be converted to a digital signal.

Then, the synchronous signal is separated from the green signal, the separated synchronous signal is used as conversion timing, and each color signal is converted from an analog signal to a digital signal at that conversion timing.

Hereinafter, there is shown the constitution of a conventional synchronous signal separation circuit.

As shown in FIGS. 4(A) and (B), a sync-on-green signal that is output from a workstation or a personal computer consists of a video signal 102 (brightness signal) higher than a reference level 100 and a synchronous signal 104 lower than the reference level 100. The sync-on-green signal is input through a signal line 106 to a video amp 108. The signal line 106 is grounded through a termination resistor 110. A voltage across the termination resistor 110 is therefore input to the video amp 108.

The video amp 108 amplifies an input voltage and adjusts the voltage of the reference level 100 to a predetermined voltage by an offset voltage so that the input sync-on-green signal (about 0.3 to 1.0 V) corresponds to the dynamic range (about 1 to 3 V) of an A/D converter 112 of the latter part. Therefore, the A/D converter 112 can convert the green brightness signal 102 to a digital signal.

Incidentally, a branch line 114 is provided between connection A of the signal line 106 with the termination resistor 110 and the video amp 108 and connected to the plus input pin of a comparator 116. To the minus input pin of the comparator 116 there is input a comparison voltage (constant). This comparison voltage is a voltage (e.g., about 0.15 V) slightly lower than the above-described reference level 100 (e.g., about 0.3 V). For this reason, the comparator 116 detects the fall of the synchronous signal 104 and outputs a logic low level signal from the comparator 116. Therefore, only the synchronous signal 104 can be fetched from the sync-on-green signal.

However, if the sync-on-green signal that is supplied to the comparator 116 is fetched from the input side of the video amp 108, a skew will occur because of the output delay time to the input in the video amp 108.

If this delay time is constant, the output of the comparator 116 can be delayed by a constant time. However, since the delay time is changed by environmental temperature and humidity, a delay of a constant time cannot solve the above-described delay time problem. Further, a skew will also occur among red, green, and blue signals.

In view of the above facts, an object of the present invention is to provide a synchronous signal separation circuit which is capable of preventing errors that are caused by jitters and delays, in separating and fetching the synchronous signal from a video signal to which a synchronous signal has been added.

SUMMARY OF THE INVENTION

The invention is a synchronous signal separation circuit for separating and fetching the synchronous signal from a video signal to which a synchronous signal has been added, and comprises an amplifier for amplifying a voltage corresponding to an input video signal so that it is within a predetermined dynamic range, and a synchronous signal fetch means which, by comparing a voltage corresponding to the video signal amplified by said amplifier with a threshold voltage adjusted based on the degree of amplification of said amplifier, fetches only said synchronous signal from said video signal.

Another embodiment of the invention is a synchronous signal separation circuit for separating and fetching the synchronous signal from a video signal to which a synchronous signal has been added, and comprises an amplifier for amplifying a voltage corresponding to an input video signal so that it is within a predetermined dynamic range, a voltage generator capable of outputting an offset voltage for shifting a reference level of a voltage corresponding to the image amplified by said amplifier so that it becomes a predetermined level, and a synchronous signal fetch means which, by comparing a video signal fetches from the output side of the amplifier with a threshold voltage in which the offset voltage output from the voltage generator has been adjusted based on the degree of amplification of said amplifier, fetches only said synchronous signal from said video signal.

According to the invention, a voltage corresponding to the video signal amplified by said amplifier is compared with a threshold voltage adjusted based on the degree of amplification of said amplifier. Therefore, the jitter or skew resulting from the delay time of the amplifier output to the amplifier input can be prevented.

In addition, since the threshold value is a value adjusted based on the degree of amplification of the amplifier, the degree of amplification of the amplifier is taken into consideration and an accurate threshold value can be obtained.

Further, the voltage generator outputs an offset voltage for shifting a reference level of a voltage corresponding to the video signal amplified by said amplifier so that it becomes a predetermined level. The synchronous signal fetch means compares the video signal with a threshold voltage to fetch the synchronous signal from the video signal. At this time, the video signal is fetched from the output side of the amplifier. Therefore, the delay time in the amplifier can be canceled.

The threshold value is a voltage in which the offset voltage output from the voltage generator has been adjusted based on the degree of amplification of said amplifier. That is, since the output voltage of the voltage generator adjusted to the offset voltage is applied as is (and also an adjustment based on the degree of amplification of the amplifier is performed), a new threshold value need not be set.

For example, when the synchronous signal separation circuit, is constituted in the form of a LSI card, a workstation or a personal computer is used as a source of a video signal, and a liquid crystal display is used as a monitor, the threshold value must correspond to a change in the characteristic of the video signal. In such a case, only the voltage of the voltage generator is adjusted and therefore the adjustment after the shipment of the LSI card (after setup) can be made easily.

In addition, since the frequency of a video signal used in an NTSC method is normally low, the delay time of the amplifier output to the amplifier input is within a range of error and there is little need for considering the delay time. However, when a synchronous signal is fetched from a high-frequency color signal, a dislocation (on about the order of 100 MHz) becomes large because of the high frequency. Therefore, fetching the synchronous signal from the video signal output from the output side of the amplifier becomes extremely effective for preventing jitter and the skew.

Note that, since a green signal is superior in visibility and often applied to the brightness signal of a black-and-white image, there are many cases (sync-on-green signal) in which a synchronous signal is added to a green signal.

BRIEF DESCRIPTION OF THE DRAWINGS

FIG. 3(1)–3(5) is a timing chart showing signals that flow through the signal lines of the circuit of FIG. 2.

DETAILED DESCRIPTION OF THE PREFERRED EMBODIMENT

Figure 1:
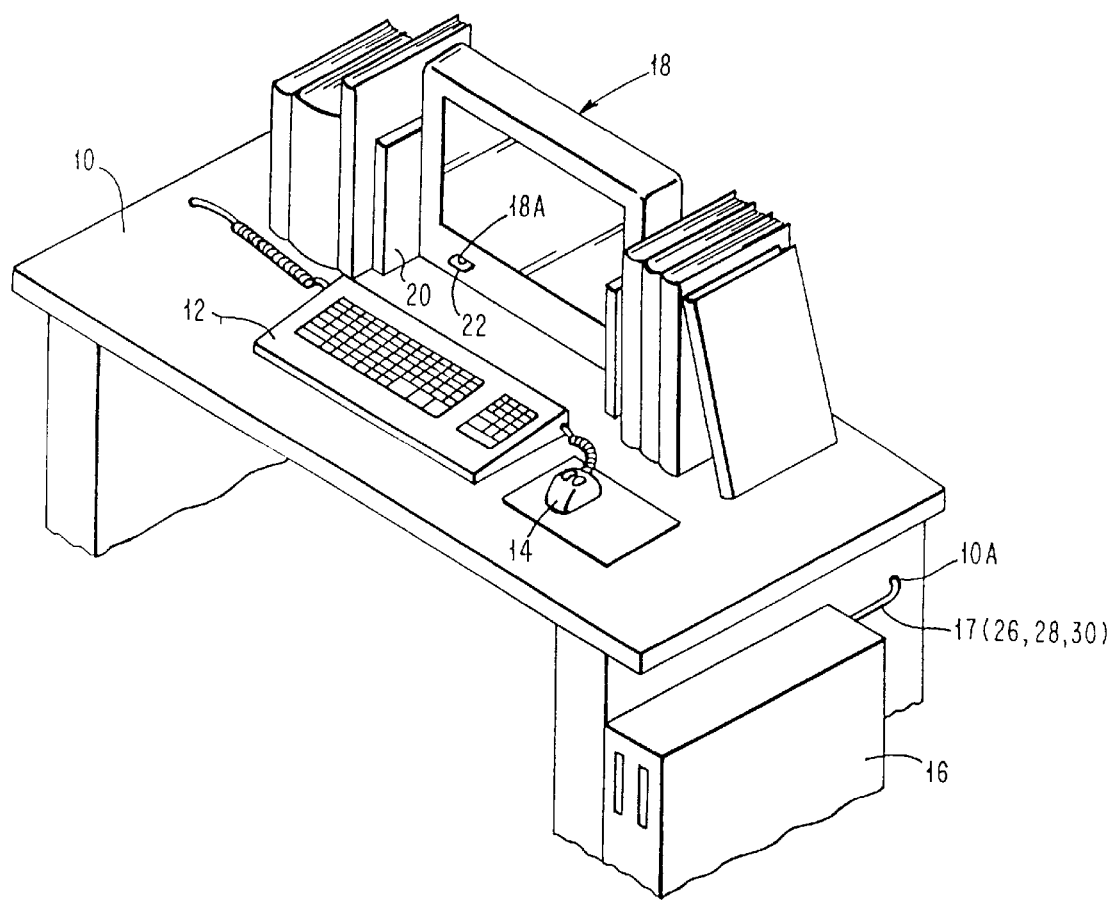
FIG. 1 is a perspective view showing a computer system according an embodiment of the present invention.

A computer system according to an embodiment of the present invention is shown in FIG. 1.

A personal computer (hereinafter referred to as a PC) 16 to which a keyboard 12 and a mouse 14 placed on a desk 10 and peripheral printer equipment (not shown) are connected is disposed beside the desk 10, and one end of a video signal output signal line harness 17 (in which color brightness signal lines 26, 28, and 30 to be described hereinafter are bundled together) is connected for outputting each of red, green, and blue video signals (brightness signals). The other end of this signal line harness 17 is wired from an opening 10A formed in the desk 10 (into the desk 10) and is connected to a liquid crystal display (LCD) monitor 18.

The LCD monitor 18 has a plurality of pixels arranged in the X and Y directions and displays an image by controlling the brightness of each pixel. It is usual, for example, that image data of one image is converted to digital signals and stored, a signal of each pixel of the X direction (horizontal scanning direction) is fetched into a shift register, and the image is displayed by shifting according to a horizontal synchronous signal in the Y direction every time of horizontal scanning.

The LCD monitor 18 such as this can be reduced in thickness and housed, for example, in a part of a bookshelf 20. For this reason, by applying the LCD monitor 18 as a display means, the space on the desk 10 can be effectively utilized, and work efficiency can be enhanced.

Incidentally, the video signal output by the PC 16 is normally an analog signal, so it is necessary to convert the video signal from an analog signal to a digital signal.

In this embodiment, at the side of the LCD monitor 18, the video signal fetched from this PC main body 16 is converted from an analog signal to a digital signal.

That is, the LCD monitor 18 is provided with a card slot 18A into which a video signal digital conversion card (hereinafter referred to as a card) 22 is inserted. Also, this card 22 has the function of separating a synchronous signal added to a video signal. The synchronous signal in the embodiment is added to a green brightness signal among the above-described video signals, and this signal will hereinafter be referred to as a sync-on-green signal, as the occasion requires.

Figure 2:
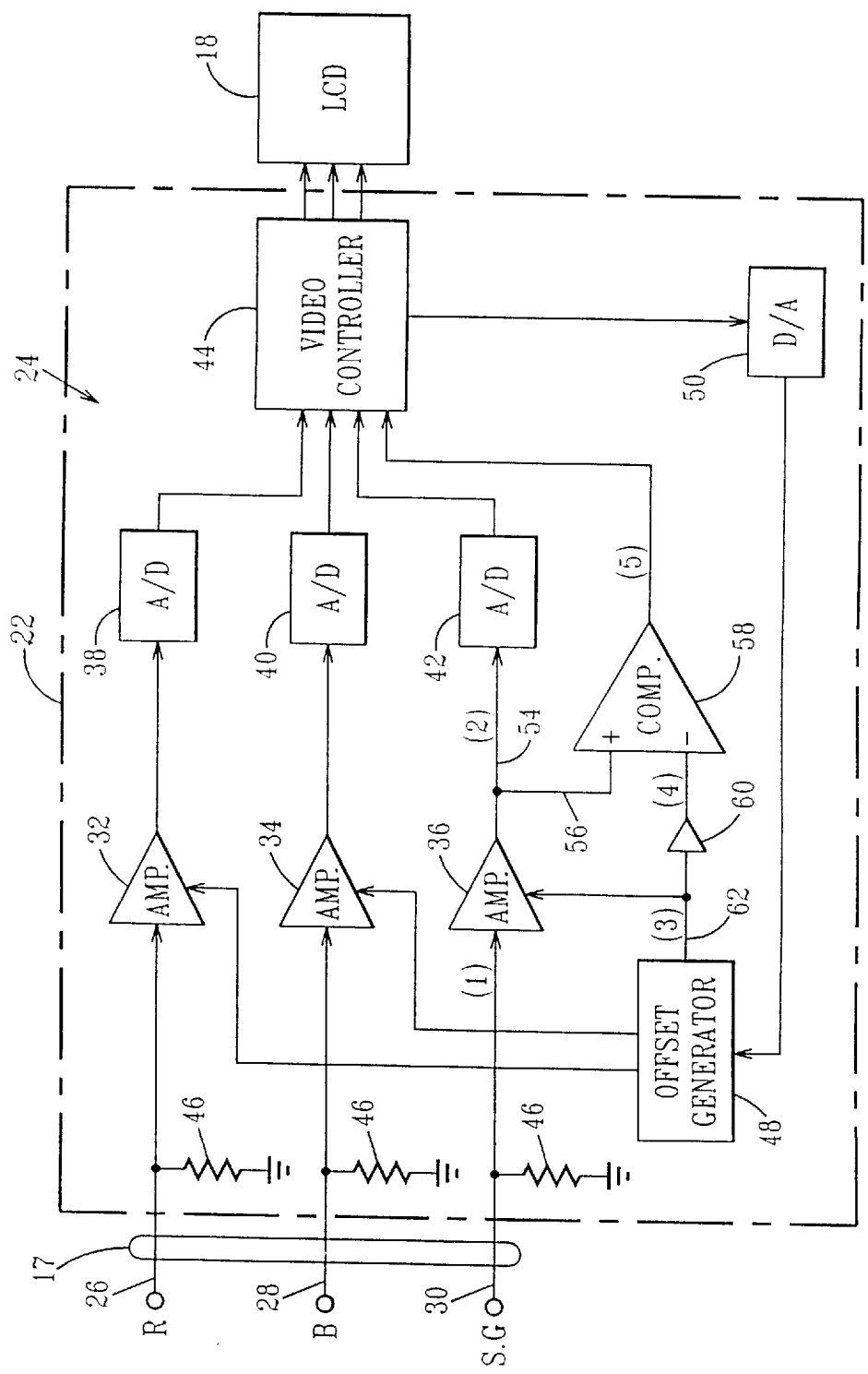
FIG. 2 is a circuit diagram showing a card constructed in accordance with the present invention for separating a synchronous signal from a video signal.

In FIG. 2 is shown a video signal conversion circuit 24 constructed in the card 22. The red (R) brightness signal, the blue (B) brightness signal, and the green (G) brightness signal of the video signals input from the PC 16 are input through video amps 32, 34, and 36 to A/D converters 38, 40, and 42 by signal lines 26, 28, and 30. The A/D converters 38, 40, and 42 convert the analog signals to digital signals. The digital signals are input to a video controller 44 and, in a synchronization state, they are supplied to a controller (not shown) of the LCD monitor 16.

The above-described signal lines 26, 28, and 30 are grounded on their ways through termination resistors 46 (in this embodiment 75 Ω). Therefore, a voltage (about 0.3 to 1.0 V) across the termination resistor 46 which varies according to the level of each brightness signal is input to the video amps 32, 34, and 36.

In the video amps 32, 34, and 36, a voltage corresponding to each brightness signal is amplified according to the dynamic range of each of the A/D converters 38, 40, and 42.

Incidentally, the reference level of the brightness signal is not constant and depends upon the PC 16 to be connected. That is, it is necessary to make the black level (or white level) of the brightness signal constant. Then, an offset generator 48 is connected to the video amps 32, 34, and 36 to supply an offset voltage for shifting the signal level amplified in each of the video amps 32, 34, and 36.

The offset voltage is different depending upon the PC 16 to be connected, so a voltage for making, for example, the 0 level (black level) of the amplified video signal constant is set by the offset generator 48.

That is, a voltage value of a reference black level is prestored in the above-described video controller 44 and compared with the voltage value of an input black level, and the difference therebetween is fed through a D/A converter 50 and back to the offset generator 48. With this feedback control, the offset generator 48 sets an offset voltage so that the black level voltage to be output from the video controller 44 becomes equal to the voltage value of the reference black level voltage prestored in the video controller 44.

For example, when in an example of the sync-on-green signal the 0 level is about 0.3 V, as shown in FIG. 3(1), it will be made about 1.3 V by the amplification of the video amp 36 (foregoing part of FIG. 3(2)). In this case, the output of the video amp 36 is shifted to about 1.6 V by the offset voltage, this voltage (about 1.6 V) becomes a reference (latter part of FIG. 3(2)), and the brightness signal is converted from an analog signal to a digital signal.

Incidentally, the sync-on-green signal (signal input to the video amp 36 through the signal line 30) is a downwardly convex synchronous signal (horizontal synchronous signal) 52B added to a step-shaped brightness signal 52A which is upwardly convex with respect to the voltage of the black level, as shown in FIG. 3(1). In order to separate this synchronous signal 52B, a branch line 56 is branched on the way of a signal line 54 connecting the output pin of the amp 36 and the A/D converter 42 and is connected to the plus input pin of a comparator 58.

That is, to the plus input pin of the comparator 58 there is input a voltage corresponding to the brightness signal amplified by the video amp 36 and also shifted by the offset voltage.

Also, to the minus side input pin of the comparator 58 there is input a threshold value voltage for detecting the falling edge of the above-described synchronous signal, as shown in FIG. 3(4). Note that the level setting of the threshold value will be described hereinafter.

For this reason, if the voltage corresponding to the amplified and shifted video signal is less than the threshold voltage, the comparator 58 will determine that the synchronous signal was detected and output a logic low level (L) signal (FIG. 3(5)). Therefore, the output signal from the comparator 58 will be only the synchronous signal 52B, and it is input to the video controller 44.

The output pin of an addition circuit 60 is connected to the minus input pin of the comparator 58. In this addition circuit 60, a voltage (about 1.1 V) corresponding to the degree of amplification of the video amp 36 is generated based on the threshold value (normally about 0.15 V) for fetching the synchronous signal of the video signal at the input side than the above-described video amp 36.

Also, to the input pin of this addition circuit 60 there is connected an output signal line 62 from the offset generator 48. If, as shown in FIG. 3(3), the offset voltage from this offset generator 48 is input, the above-described generated voltage will be shifted by the amount of voltage (about 0.2 V) that is shifted by the video amp 36 (FIG. 3(2)).

Therefore, to the comparator 58 there is input a threshold voltage (about 1.3 V) in which the amount of amplification by the video amp 36 and the amount of shift by the offset voltage are taken into consideration.

The operation of this embodiment will be described hereinafter. If the brightness signal of each color is output by the PC main body 16, this signal will have be converted to a digital signal to correspond to the LCD monitor 18, because it is an analog signal.

The card 22 is then inserted into the card slot 18A of the LCD monitor 18. The video signal conversion circuit 24 is constructed in the card 22, and the digital conversion is performed in the following procedure:

The red, blue, and green brightness signals are amplified by the video amps 32, 34, and 36 and then input to the A/D converters 38, 40, and 42. With this amplification, the brightness signals can be within the dynamic ranges of the A/D converters 38, 40, and 42. In the A/D converters 38, 40, and 42, the analog signals are converted to digital signals and then output to the video controller 44.

Incidentally, the reference level of each of the color brightness signals is different depending upon the PC 16 to be used. More particularly, the voltage value of the black or white level is different. For this reason, in the video controller 44, the voltage of the reference black level and the voltage of the black level of the input signal are compared in advance. As a result of this comparison, if there is a difference, a digital signal equivalent to that different will be output to the D/A converter 50. The D/A converter 50 converts the digital signal to an analog signal and then outputs it to the offset generator 48 to control the output voltage (offset voltage) of the offset generator 48. This offset voltage is supplied to the video amp 36, and the output of the video amp 36 is shifted according to the offset voltage.

By performing such feedback control, the voltage of an optimum reference level is made consistent with the reference voltage of the video controller 44 and, thereafter, a constant offset voltage will be applied. After the feedback control of the reference level has been completed, the video controller 44 outputs each color brightness signal to the controller of the LCD monitor 16.

Incidentally, a synchronous signal has been added to the green (G) brightness signal (sync-on-green signal) and therefore it is necessary to separate only the synchronous signal from this sync-on-green signal.

For this reason, in this embodiment, the green (G) brightness signal is amplified by the video amp 36 and also the signal shifted by the offset voltage is fetched from the signal line 54 through the branch line 56.

With this branch line 56, the sync-on-green signal is input to the plus input pin of the comparator 58.

The threshold value corresponding to the degree of amplification of the video amp 36 which was generated by the addition circuit 60 is to be input to the minus input pin of this comparator 58, but the video amp 36 has been shifted according to the offset voltage output by the offset generator 48, in addition to amplification. Then, the offset voltage from the offset generator 48 is supplied to the input pin of the addition circuit 60, and a voltage in which the amount of amplification by the video amp 36 and the amount of shift by the offset voltage are taken into consideration, is output as a threshold value.

The comparator 58 can reliably detect the falling edge of the synchronous signal and output only the synchronous signal from the output pin thereof.

The output signal from the comparator 58 is input to the video controller 44 and synchronized with the brightness signal of each color output from each of the A/D converters 38, 40, and 42, and can be supplied to the LCD monitor 16.

The branch line 56 for fetching the synchronous signal is provided according to this embodiment on the output side of the video amp 36. Therefore, there is no need for taking into consideration the delay time of the video amp 36 which occurs when the synchronous signal is fetched at the input side of the video amp 36. That is, there is no occurrence of the jitter and skew that are caused by the delay time, and the input timing of each color brightness signal to the video controller 44 can be made accurately consistent with the input timing of the synchronous signal to the video controller 44.

Also, since in the conventional circuit the offset voltage is controlled in the A/D converter, there were some cases where there occurred a change in the threshold value resulting from a shift corresponding to this offset voltage. However, in this embodiment, since the adjustment of the offset voltage has been executed by the feedback control that is mainly based on the offset generator 48, and the offset voltage set by this feedback control has been supplied to the addition circuit 60, a threshold value in which an offset quantity is taken into consideration can be changed and set easily and dynamically.

Figure 4A:
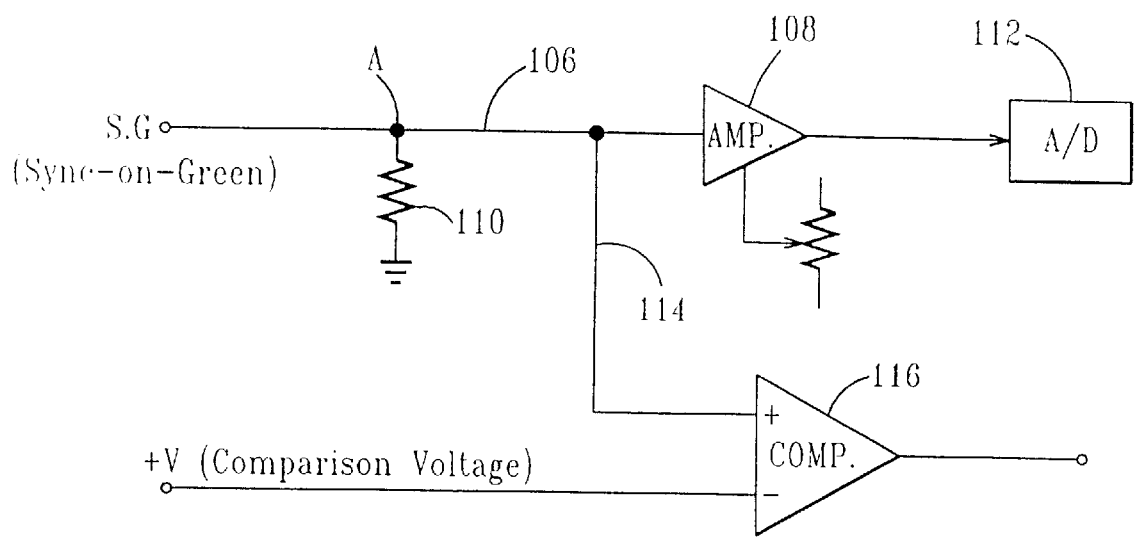
FIG. 4(A)–4(B) is a circuit diagram showing the constitution of a circuit for separating a synchronous signal from a conventional video signal.
Figure 4B:
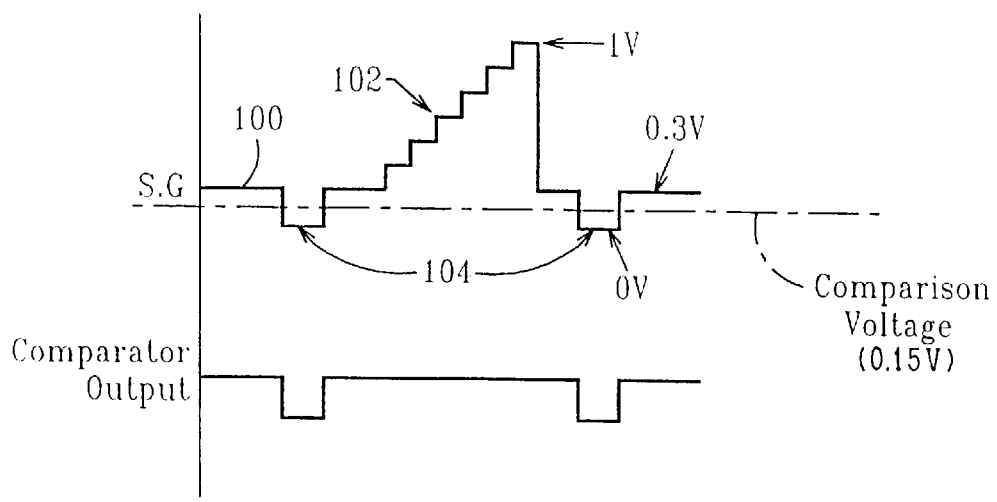

While, in the above-described embodiment, the PC 16 whose offset voltage is unknown has been taken as an example and the offset value after the feedback control has been supplied from the offset generator 48 to the addition circuit 60, the present invention is not limited to this circuit constitution. If the offset voltage is known, a threshold value may be supplied as a constant to the comparator 58. In such a case, if the circuit construction, as compared with the prior art (FIG. 4), is changed only so that the sync-on-green signal to be compared is fetched from the output side of the video amp 36, the conventional problems can be solved.

As has been described hereinbefore, the synchronous signal separation circuit according to the present invention has the excellent advantage that, in separating and fetching the synchronous signal from a video signal to which a synchronous signal has been added, errors due to jitter and delay can be prevented.

We claim:

1. A synchronous signal separation circuit for separating and fetching a synchronous signal from a video signal to which the synchronous signal has been added, comprising:

an amplifier for amplifying a voltage of the video signal to output an amplified signal having an amplified voltage which is within a predetermined dynamic range; and a synchronous signal fetch means which, by comparing the amplified voltage with a threshold voltage adjusted based on the degree of amplification of said amplifier, fetches only said synchronous signal from said video signal.

2. The synchronous signal separation circuit of claim 1, further comprising a voltage generator which outputs a variable offset voltage to said amplifier for shifting a reference level of the amplified signal to a predetermined level.

3. The synchronous signal separation circuit of claim 2, wherein said voltage generator is in a feedback loop of said amplifier.

4. The synchronous signal separation circuit of claim 2, further comprising a video controller for storing said predetermined level.

5. A synchronous signal separation circuit for separating and fetching a synchronous signal from a video signal to which the synchronous signal has been added, comprising:

an amplifier for amplifying a voltage of the video signal to output an amplified signal having an amplified voltage which is within a predetermined dynamic range;

a voltage generator which outputs a variable offset voltage to said amplifier for shifting a reference level of the amplified voltage to a predetermined level; and a synchronous signal fetch means which, by comparing the amplified video signal with a threshold voltage in which the variable offset voltage has been adjusted based on the degree of amplification of said amplifier, fetches only said synchronous signal from said video signal.

6. The synchronous signal separation circuit of claim 5, wherein said voltage generator is in a feedback loop of said amplifier.

7. The synchronous signal separation circuit of claim 5, further comprising a video controller for storing said predetermined level.

* * * * *